July 26, 1955  R. B. HOLDAWAY  2,713,742
FISHING HOOK BAFFLE
Filed Aug. 12, 1952
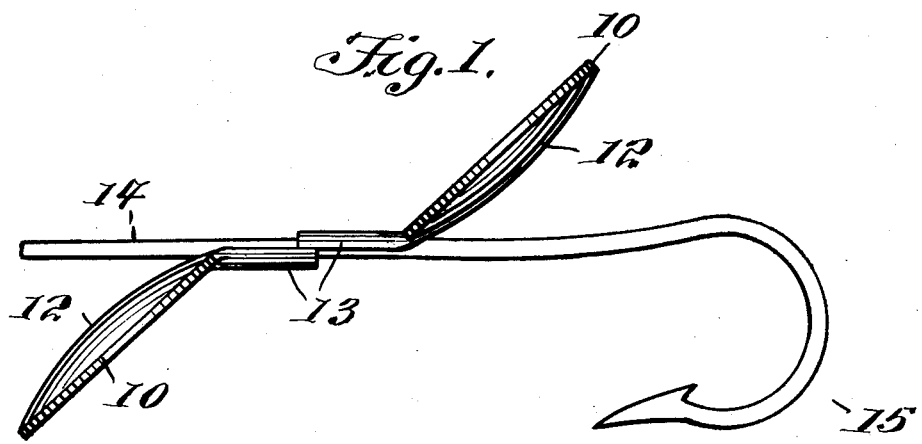
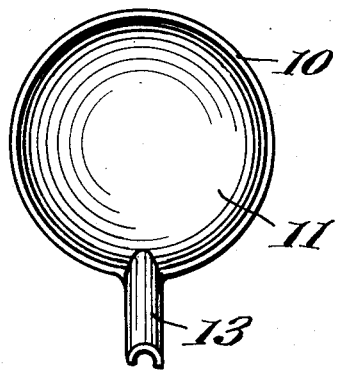
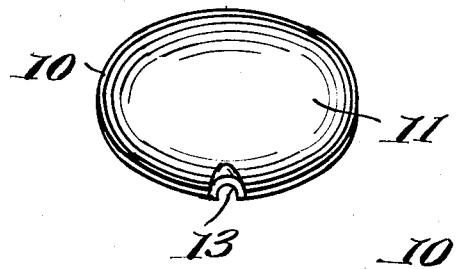
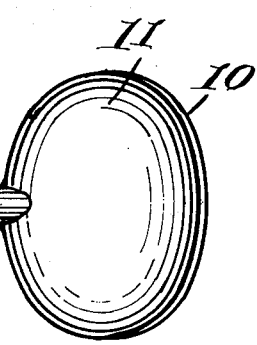
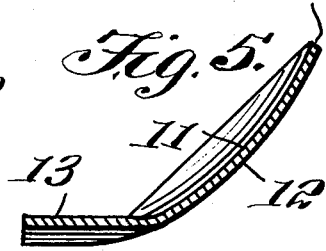
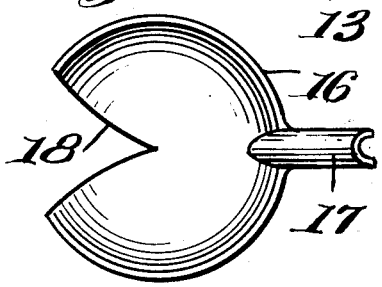
INVENTOR.
Randall B. Holdaway,
BY Victor J. Evans & Co.
ATTORNEYS

United States Patent Office 2,713,742
Patented July 26, 1955

2,713,742

FISHING HOOK BAFFLE

Randall B. Holdaway, Provo, Utah

Application August 12, 1952, Serial No. 303,847

1 Claim. (Cl. 43—42.38)

This invention relates to fish lures particularly of the activated type, and in particular a fin or baffle mounted on or adapted to be mounted on the shank of a hook to impart motion to a hook as it passes through water.

The purpose of this invention is to replace conventional spoons and other deflecting devices of fishing lures with a baffle mounted on the shank of a hook whereby hooks may be provided with baffles or baffles may be supplied independently and attached to hooks.

Various types of devices have been used in combination with fish hooks to attract the attention of a fish as a hook passes through the water, however, it is customary with devices of this type, to attach a hook so a spoon or other deflecting element so that it is necessary to purchase the entire combination such as a spoon with a hook mounted thereon and with this type of lure it is substantially impossible to change the positions of the parts thereof. With this thought in mind this invention contemplates a spoon or baffle having a clip at one side whereby the device may readily be crimped, to a shank of a fish hook, whereby the device may be used as desired and wherein the position thereof is readily adjustable.

The object of this invention is, therefore, to provide a deflecting baffle or spoon with mounting means whereby the said baffle or spoon may readily be installed on the shank of a fish hook.

Another object of the invention is to provide a device for imparting motion to a fish hook that may be clamped on hooks now in use and in which a plurality of said devices may be secured on one hook.

A further object of the invention is to provide a deflecting baffle or spoon for fish hooks in which the device is of a simple and economical construction.

With these and other objects and advantages in view the invention embodies a substantially circular plate having an indented or concave surface in one side and a convex surface on the opposite side and a substantially semi-circular shank extended from one side thereof whereby with the shank on a shank of a fish hook the circular plate extends outwardly from the hook whereby a dip and dart action is imparted to a hook as it passes through the water.

Other features and advantages of the invention will appear from the following description taken in connection with the drawing, wherein:

Figure 1 is a side elevational view illustrating a pair of the baffles and showing both of the baffles mounted on the shank of the fishing hook.

Figure 2 is a view of the baffle looking from a point perpendicular to the face thereof.

Figure 3 is an end view of the baffle looking toward one end of the mounting stem thereof.

Figure 4 is a plan view of the baffle.

Figure 5 is a longitudinal section through the baffle.

Figure 6 is a view similar to that shown in Fig. 2 illustrating a modification wherein a V-notch is provided in the baffle forming a fish tail baffle.

Referring now to the drawings wherein like reference characters denote corresponding parts the improved fishing lure deflecting baffle of this invention includes a circular plate 10 having a concave surface 11 in one side with a convex surface 12 on the opposite side and having a mounting stem 13, substantially semi-circular in cross section, extended from a point at one edge thereof.

With the parts formed in this manner the stem 13 is adapted to be crimped over a shank, as indicated by the numeral 14, of a fishing hook 15 and with the plate 10 positioned at an angle to the axis of the stem 13, as shown in Fig. 1 the plate will extend from the shank at an angle whereby motion is applied to the hook as it is drawn through the water.

With two of the devices mounted on the shank of a fish hook, as shown in Fig. 1 a zigzag action will be imparted to the hook and it will be understood that by positioning the baffles on opposite sides of a shank, as shown in Fig. 1 or with one baffle extended at an angle from one side of the shank, substantially the action desired may be imparted to a fish hook.

It will also be understood that as many of the baffles as may be desired may be used on the shank, of a hook. The size of the baffle in relation to the hook is also adapted to be changed to reduce or increase the zigzag motion of the hook as it passes through the water.

In the design shown in Fig. 6 a plate 16 having a stem 17, similar to the stem 13 is provided with a V-shaped notch 18, representing a fish tail and whereby a different action is imparted to a hook upon which the device is positioned. The device may, therefore be provided in different sizes and designs and it will be understood that the device may be made of metal, plastic, or other suitable material.

It will also be understood that other modifications within the scope of the appended claim, may be made in the design and arrangement of the parts without departing from the spirit of the invention.

What is claimed is:

In a fish lure, a fish hook including an elongated cylindrical shank and a barb extending from an end of said shank, a first baffle and a second baffle mounted on the shank of said fish hook, each of said baffles having the same shape and each including a semi-cylindrical stem embracing said shank, said stems being arranged on opposite sides of said shank and having adjacent end portions arranged in overlapping relation with respect to each other and having non-adjacent end portions extending away from each other in opposite directions, said stems being secured to said shank, but said stems not being secured to each other, a plate having a rounded peripheral edge extending from the non-adjacent end of each of said stems, each of said plates being provided with a convex surface on one side and a concave surface on the other side thereof, said plates having their peripheral edges arranged in planes that are parallel to each other, and which lie at an angle other than 90 degrees from the longitudinal axis of said stems, at least one of said plates being provided with a V-shaped notch, said notch extending from the peripheral edge of said plate to a point substantially at the center of said plate, the outer portion of said notch being wider than the inner portion thereof.

References Cited in the file of this patent

UNITED STATES PATENTS

| | | |
|---|---|---|
| Re. 17,955 | Arbogast | Feb. 10, 1931 |
| 699,397 | Lacey | May 6, 1902 |
| 1,590,529 | Larzelere et al. | June 29, 1926 |
| 1,836,651 | Davenport | Dec. 15, 1931 |
| 2,231,507 | Richards | Feb. 11, 1941 |
| 2,462,828 | Parnell | Feb. 22, 1949 |
| 2,564,216 | Stark | Aug. 14, 1951 |
| 2,585,783 | Johnston | Feb. 12, 1952 |
| 2,588,055 | Smith | Mar. 4, 1952 |